(12) United States Patent
Sawada et al.

(10) Patent No.: US 11,504,820 B2
(45) Date of Patent: Nov. 22, 2022

(54) GANTRY TYPE CONVEYING DEVICE AND PROCESSING LINE

(71) Applicant: KOMATSU NTC LTD., Toyama (JP)

(72) Inventors: Minoru Sawada, Toyama (JP); Hiroki Hayashi, Toyama (JP)

(73) Assignee: KOMATSU NTC LTD., Toyama (JP)

( * ) Notice: Subject to any disclaimer, the term of this patent is extended or adjusted under 35 U.S.C. 154(b) by 409 days.

(21) Appl. No.: 15/761,087

(22) PCT Filed: Sep. 1, 2016

(86) PCT No.: PCT/JP2016/075652
§ 371 (c)(1),
(2) Date: Mar. 17, 2018

(87) PCT Pub. No.: WO2017/047394
PCT Pub. Date: Mar. 23, 2017

(65) Prior Publication Data
US 2018/0257188 A1 Sep. 13, 2018

(30) Foreign Application Priority Data

Sep. 17, 2015 (JP) .............................. JP2015-183535

(51) Int. Cl.
*B23P 21/00* (2006.01)
*B23Q 7/00* (2006.01)
(Continued)

(52) U.S. Cl.
CPC .......... *B23Q 7/1452* (2013.01); *B23P 21/006* (2013.01); *B23Q 1/012* (2013.01);
(Continued)

(58) Field of Classification Search
CPC . B23Q 3/00; B23Q 3/06; B23Q 3/061; B23Q 3/15724; B23Q 7/00; B23Q 7/001;
(Continued)

(56) References Cited

U.S. PATENT DOCUMENTS 5,081,889 A * 1/1992 Takano ...................... B23B 5/02
82/122
5,525,029 A * 6/1996 Taylor .................... B65G 61/00
294/67.2

(Continued)

FOREIGN PATENT DOCUMENTS

CN 201702776 U 1/2011
CN 102950503 A 3/2013
(Continued)

OTHER PUBLICATIONS

English machine translation of JPH0627309 (Year: 1994).*
(Continued)

*Primary Examiner* — Lee D Wilson
*Assistant Examiner* — Alberto Saenz
(74) *Attorney, Agent, or Firm* — Capitol City TechLaw, PLLC; Samuel P. Burkholder

(57) ABSTRACT

This gantry type conveying device is provided with: a beam which is horizontally installed; a runner traveling along the beam; an elevator supported to be movable in the vertical direction with respect to the runner; and a loading part which is supported by the lower portion of the elevator and on which a workpiece is loaded. This processing line has the gantry type conveying device and a machine tool. The machine tool is provided with: a base; and a workpiece supporting device provided movable with respect to the base in a forward and backward direction perpendicular to the extending direction of the beam when viewed in a plane.

14 Claims, 14 Drawing Sheets

(51) Int. Cl.
*B23Q 7/14* (2006.01)
*B23Q 7/04* (2006.01)
*B23Q 1/01* (2006.01)
B23P 23/02 (2006.01)
B23Q 3/157 (2006.01)

(52) U.S. Cl.
CPC ............. *B23Q 7/005* (2013.01); *B23Q 7/04* (2013.01); *B23Q 7/048* (2013.01); B23P 23/02 (2013.01); B23Q 3/15724 (2016.11)

(58) Field of Classification Search
CPC . B23Q 7/005; B23Q 7/04; B23Q 7/05; B23Q 7/16; B23Q 7/165; B23Q 7/18; B23Q 7/1452; B23Q 1/25; B25B 11/00; B25B 11/002; B23P 21/006; B23P 23/02; B25J 15/0014; B66C 1/22; B66C 1/223
USPC ....................... 29/525.13; 294/67.2
See application file for complete search history.

(56) References Cited

U.S. PATENT DOCUMENTS

| | | | | |
|---|---|---|---|---|
| 7,645,103 B2 * | 1/2010 | Schmidt | ............ | B23Q 5/28 409/168 |
| 8,584,559 B2 * | 11/2013 | Geiser | ............ | B23B 13/02 82/124 |
| 8,663,077 B2 * | 3/2014 | Katoh | ............ | B23Q 7/045 483/14 |

FOREIGN PATENT DOCUMENTS

| | | | |
|---|---|---|---|
| CN | 103896108 A | | 7/2014 |
| GB | 1456385 A | | 11/1976 |
| GB | 2325915 | * | 12/1998 |
| JP | H2-53335 U | | 4/1990 |
| JP | 05-004186 A | | 1/1993 |
| JP | H0627309 Y2 | * | 7/1994 |
| JP | 8-257880 A | | 10/1996 |
| JP | H1015770 A | | 1/1998 |
| JP | 2002-161527 A | | 6/2002 |
| JP | 2002-178238 A | | 6/2002 |
| JP | 2004-243487 A | | 9/2004 |
| JP | 2004243487 A | * | 9/2004 |
| JP | 4213538 B2 | | 1/2009 |
| JP | 2014065133 A | | 4/2014 |

OTHER PUBLICATIONS

STIC Search Results (Year: 2021).*
East machine translation GB 2325915 (Year: 1998).*
State Intellectual Property Office of People's Republic of China, Office Action dated Feb. 22, 2019, issued in corresponding appln. No. 2016 80054097.1 in Chinese and English (7 pages each).
International Search Report from PCT/JP2016/0075652 dated Nov. 29, 2016, by Japan Patent Office—English Version (2 pages).
International Search Report from PCT/JP2016/0075652 dated Nov. 29, 2016, by Japan Patent Office—Japanese Version (2 pages).
Guo Tie Qiao, "Material Handling System," Sep. 2013, p. 230, China Electric Power Publishing House—English Translation (2 pages).
State Intellectual Property Office of People's Republic of China, Third Office Action dated Apr. 21, 2020, issued in corresponding appln. No. 2016 80054097.1 in Chinese and English (8 and 7 pages each, respectively).
Japanese Patent Office, Notice of Reasons for Refusal dated Apr. 30, 2020, issued in corresponding appln. No. 2015-183535 in Japanese and English (5 pages each).
Guo Tie Qiao, "Material Handling System," Sep. 2013, p. 230, China Electric Power Publishing House (3 pages).
State Intellectual Property Office of People's Republic of China, Fourth Office Action dated Sep. 21, 2020, issued in corresponding appln. No. 2016 80054097.1 in Chinese and English (7 and 8 pages each, respectively).
"Process Equipment Three-Dimensional Design and Manufacture", Xu Chunlin, p. 44, China University of Science and Technology Press, Mar. 2010, in Chinese and English (3 and 1 pages each, respectively).

* cited by examiner

FIG. 3
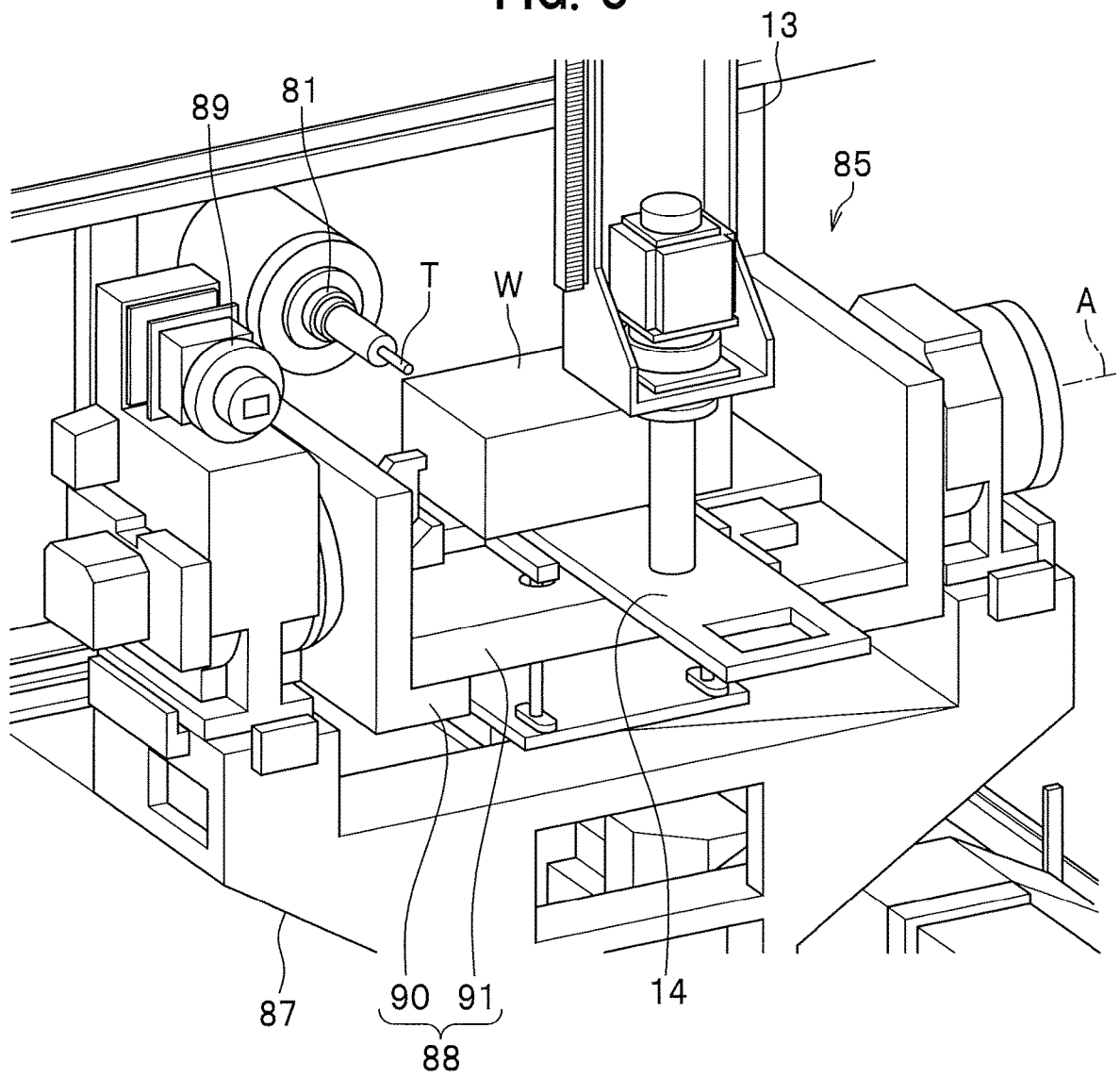
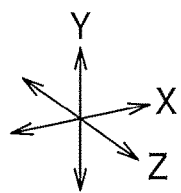

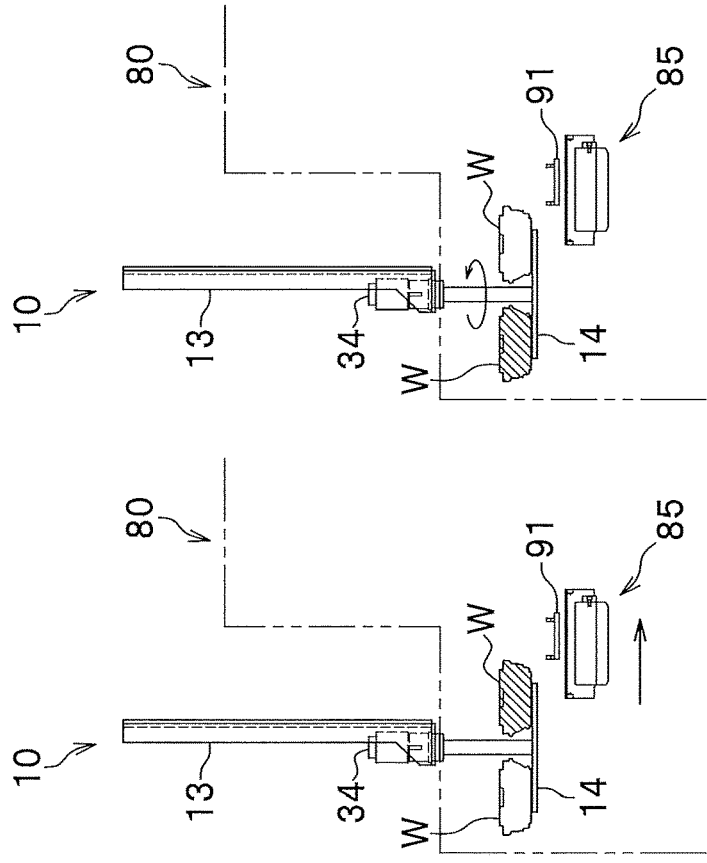

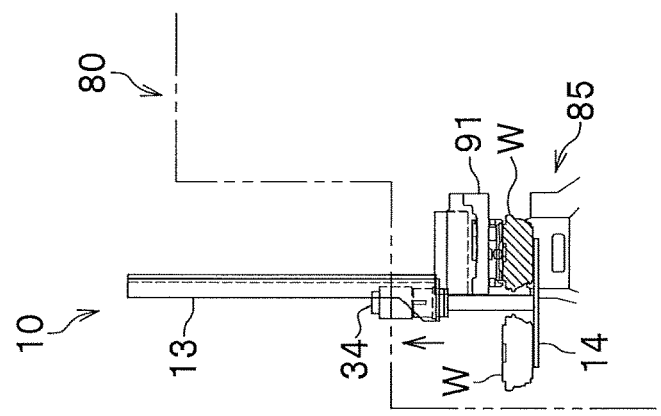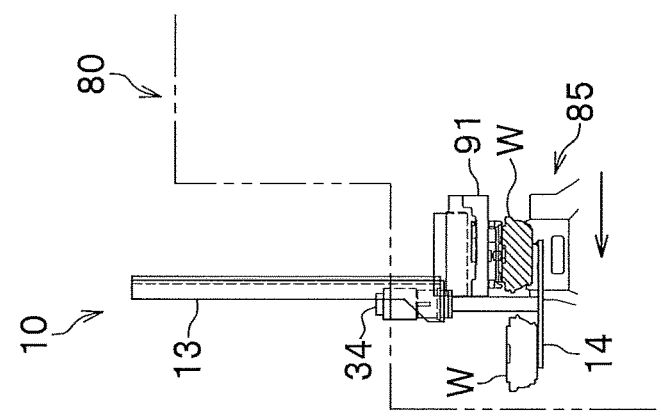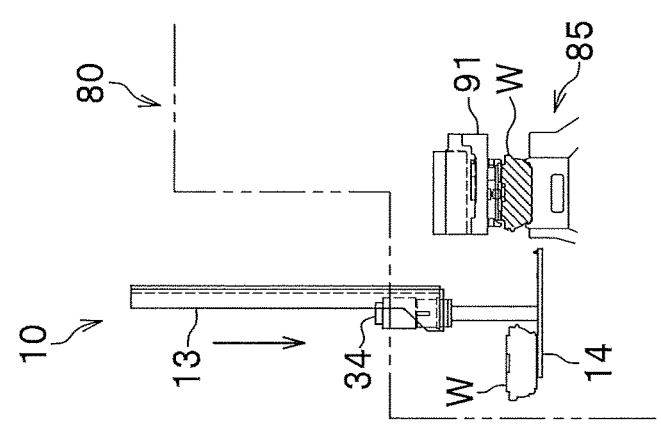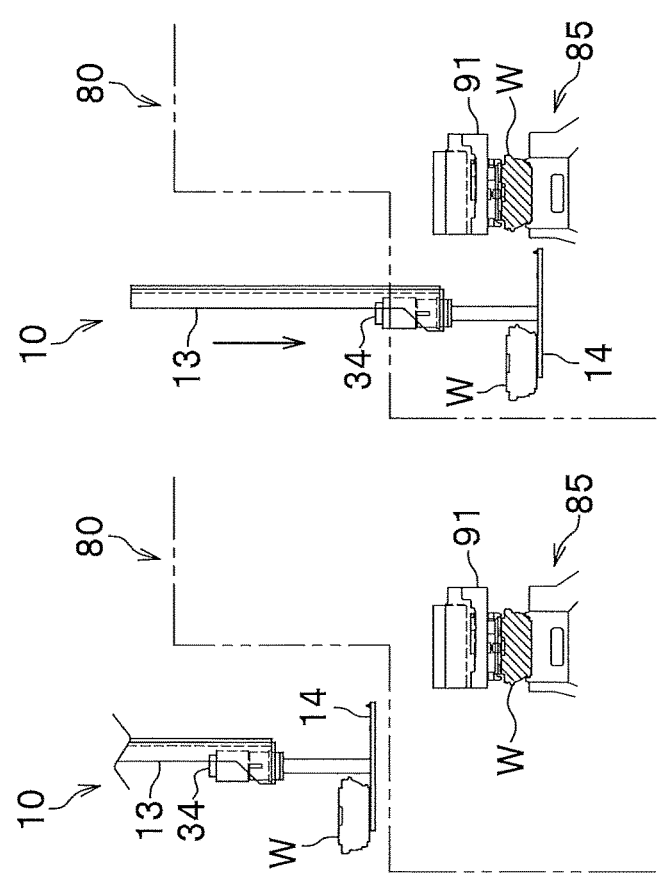

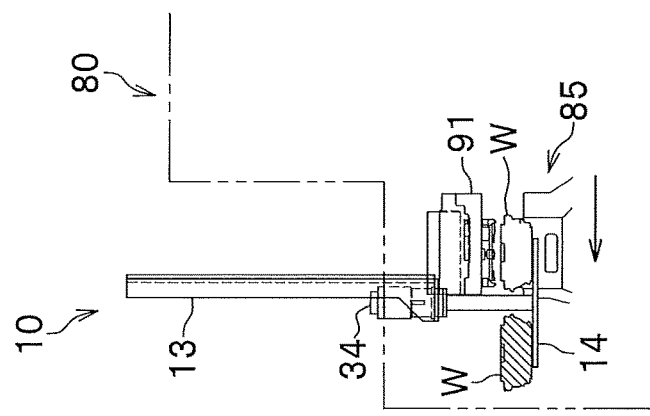

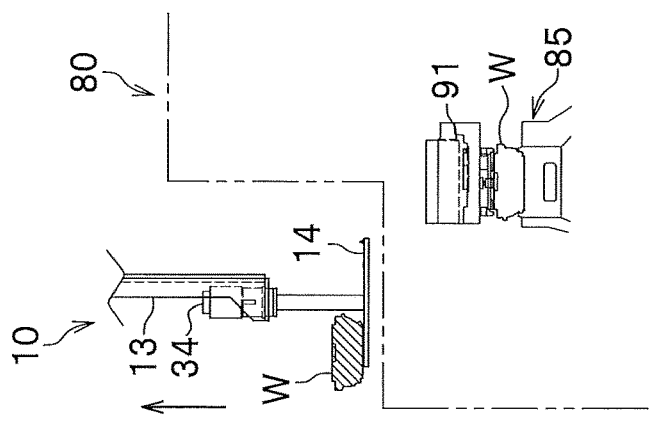
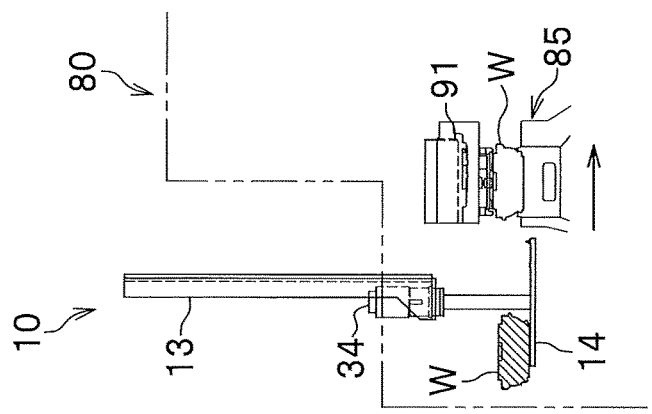
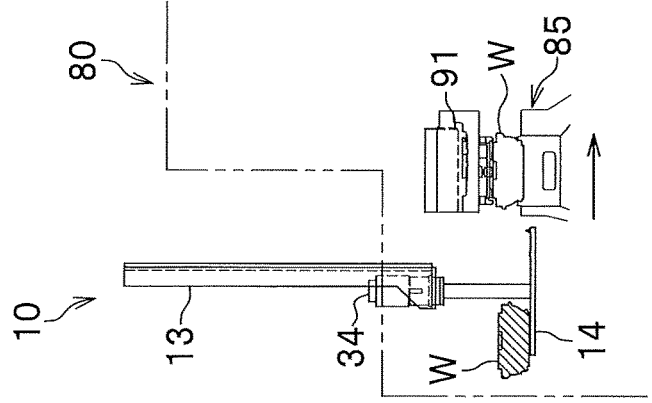
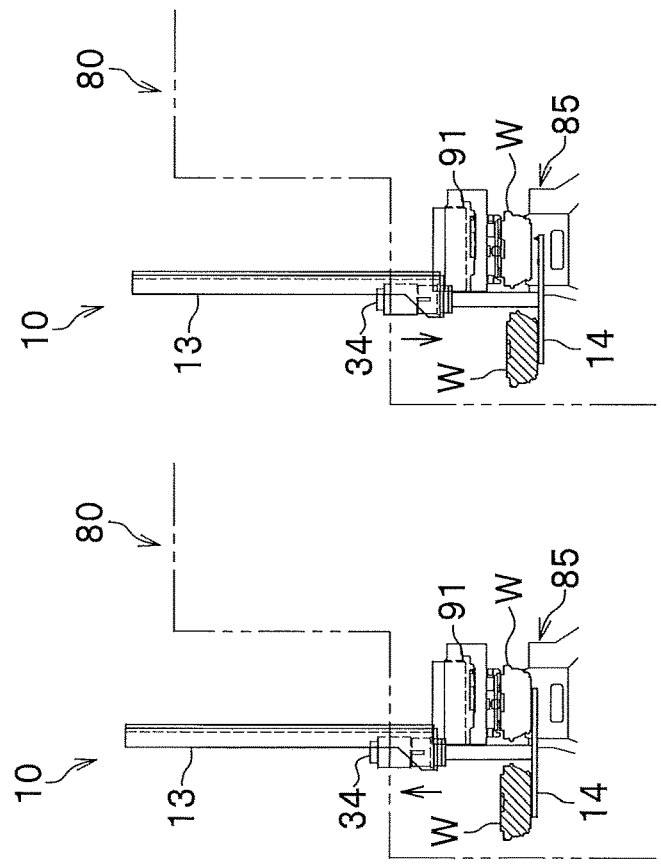

GANTRY TYPE CONVEYING DEVICE AND PROCESSING LINE

CROSS-REFERENCE TO RELATED APPLICATION

This application is a U.S. National Stage Application under 35 U.S.C. § 371 of International Patent Application No. PCT/JP2016/075652 filed Sep. 1, 2016, which claims the benefit of priority to Japanese Patent Application No. 2015-183535 filed Sep. 17, 2015, the disclosures of all of which are hereby incorporated by reference in their entities.

TECHNICAL FIELD

The present invention relates to a gantry type conveying device and a processing line.

BACKGROUND ART

Patent Document 1 (JP2002-178238 A) discloses an automatic supply and removal device for supplying and removing a work to/from a machine tool, as an example of a conventional gantry type conveying device.

This automatic supply and removal device is provided with a beam horizontally supported by two posts, a robot main-body (runner) moving along this beam, and a robot hand provided to this robot main-body to hold a work (see paragraphs [0020], FIG. 9, etc.).

RELATED ART DOCUMENT

Patent Document

Patent Document 1: JP2002-178238 A

DISCLOSURE OF THE INVENTION

Problems to be Solved by the Invention

However, on the automatic supply and removal device (gantry type conveying device) described in Patent Document 1, the robot hand, which is a part for holding a work, has a complicated structure because the robot hand clamps and conveys the work during conveying. Further, as it is necessary to mount units such as clamp driving means on the robot hand, the number of components is large and the cost is high.

The present invention has been developed in this situation, and an object of the invention is to provide a gantry type conveying device and a processing line that enables reduction in the number of components and has a compact and simple structure.

Means for Solving the Problems

In order to solve the above-described problems, a gantry type conveying device according to the invention includes: a beam horizontally arranged; a runner that runs along the beam; an elevator that is supported movably in upper-lower direction relatively to the runner; and a mount that is supported at a lower portion of the elevator to mount thereon a conveyance object.

By this structure, the conveyance object is conveyed such as to be mounted on the mount that is supported at the lower portion of the elevator movable in the upper/lower direction relatively to the runner running along the beam. In other words, the conveyance object is lifted by the mount and moved (lift and carry). In such a manner, on the gantry type conveying device, just by mounting a conveyance object on the mount without clamping a conveyance object such as a work as conventionally done, the conveyance object can be held and conveyed. Thus, according to the present invention, a unit such as clamp driving means in unnecessary.

Consequently, according to the invention, it is possible to provide a gantry type conveying device that enables reduction in the number of components and has a compact and simple structure.

Further, on the gantry type conveying device, the conveying time can be shortened because clamping operation of a conveyance object is not performed. Still further, as the mount has a simple structure without driving means nor electrical wires, even when the kind of a conveyance object such as a work is changed, it is possible to easily replace the mount, corresponding to the kind of the conveyance object.

The above-described gantry type conveying device is preferably arranged such that: a plurality of the conveyance objects can be mounted on the mount; and the mount is supported at the lower portion of the elevator rotatably around a vertical axis.

By this structure, as it is possible to mount a plurality of, for example, works on a single mount and simultaneously convey them, efficient conveyance is possible. For example, on a gantry type conveying device on which conventional clamping of works, in order to replace a work before processing and a work after processing by a machine tool, it is necessary to provide two robot hands to the device as one set for work replacement. In contrast, by this structure, for example, by mounting a work before processing and a work after processing on a single mount and rotating the mount around a vertical axis, it is possible to selectively move one work to a position facing a machine tool. In such a manner, it is possible to replace a work before processing and a work after processing, using a single mount.

The above-described gantry type conveying device is preferably arranged such that: the mount is provided with a positioning member that positions the conveyance object on the mount.

By this structure, it is possible to prevent a conveyance object from being shifted from the mount, and ensure the delivery of the conveyance object between the mount and, for example, a machine tool.

In order to solve the above-described problems, a processing line according to the present invention includes: the above-described gantry type conveying device; and a machine tool that performs processing of a work, wherein the conveyance object include the work, and wherein the machine tool is provided with a base, and a work support device that is arranged movably in a direction perpendicular to an extension direction of the beam in a plan view and supports the work.

By this structure, it is possible to provide a processing line for which a gantry type conveying device, which has a compact and simple structure and enables reduction in the number of components, is applied for a machine tool.

Further, using the work support device of the machine tool, as a mechanism for conveying a conveyance object in a direction perpendicular to a beam, it is possible to convey this conveyance object to an arbitrary position in three-dimensional direction. In such a manner, it is possible to make the structure of the entire processing line more compact and simple.

The above-described processing line is preferably arranged such that: the work support device includes a carriage movable in the direction perpendicular to the extension direction of the beam in the plan view, and a holding section that is installed to the carriage and holds the work: and the holding section is rotatable around an axis that is parallel to the beam.

By this structure, in making the holding section hold a work, it is possible to select one of the upper surface and the lower surface of the work, as the fitting reference surface, the one facing the holding section. That is, it is possible to replace the fitting reference surface, of the work, which faces the holding section. In such a manner, for example, processing of both the upper surface and the lower surface of the work is made possible.

The above-described gantry type conveying device preferably further includes: a shifting device that delivers the conveyance object between itself and the mount and moves the conveyance object in a direction perpendicular to an extension direction of the beam in a plan view.

By this structure, it is possible by the shifting device to move a conveyance object in a direction perpendicular to the beam, the conveyance object being lifted by the mount and moved along the beam. In such a manner, the conveyance object can be conveyed to a three dimensionally arbitrary position.

Advantageous Effect of the Invention

According to the present invention, it is possible to provide a gantry type conveying device and a processing line that enables reduction in the number of components and has a compact and simple structure.

BRIEF DESCRIPTION OF THE DRAWINGS

FIG. 3 is a schematic perspective view showing the periphery of a work support device of a machine tool shown in FIG. 1;

FIGS. 9A to 9D are schematic side views for illustrating the method of conveying a work following FIGS. 8A to 8D;

FIGS. 12A to 12D are schematic side views for illustrating a method of conveying a work, with the upper surface of the work as a fitting reference surface facing a jig;

FIGS. 13A to 13D are schematic side views for illustrating the method of conveying a work following FIGS. 12A to 12D; and FIGS. 14A to 14D are schematic side views for illustrating the method of conveying a work following FIGS. 13A to 13D.

EMBODIMENTS FOR CARRYING OUT THE INVENTION

Figure 1:
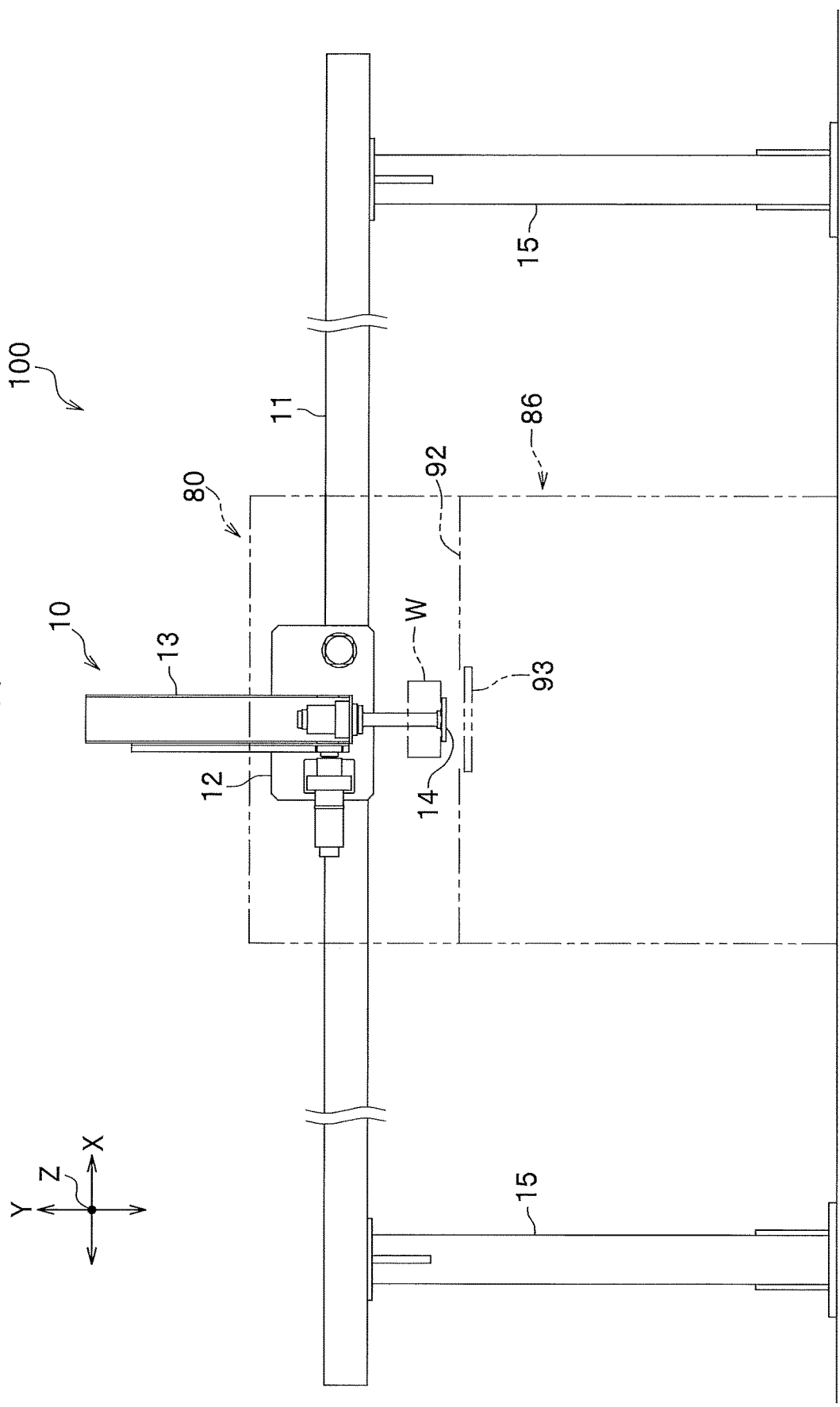
FIG. 1 is a schematic front view of a processing line in an embodiment of the present invention.

Embodiments of the present invention will be described in detail, referring to the drawings, as appropriate.

In the respective figures, the same reference symbols will be assigned to the same elements, and overlapping description will be omitted. Further, the size and the shape of a member may be schematically represented with a change or exaggeration for the convenience of illustration.

Figure 2:
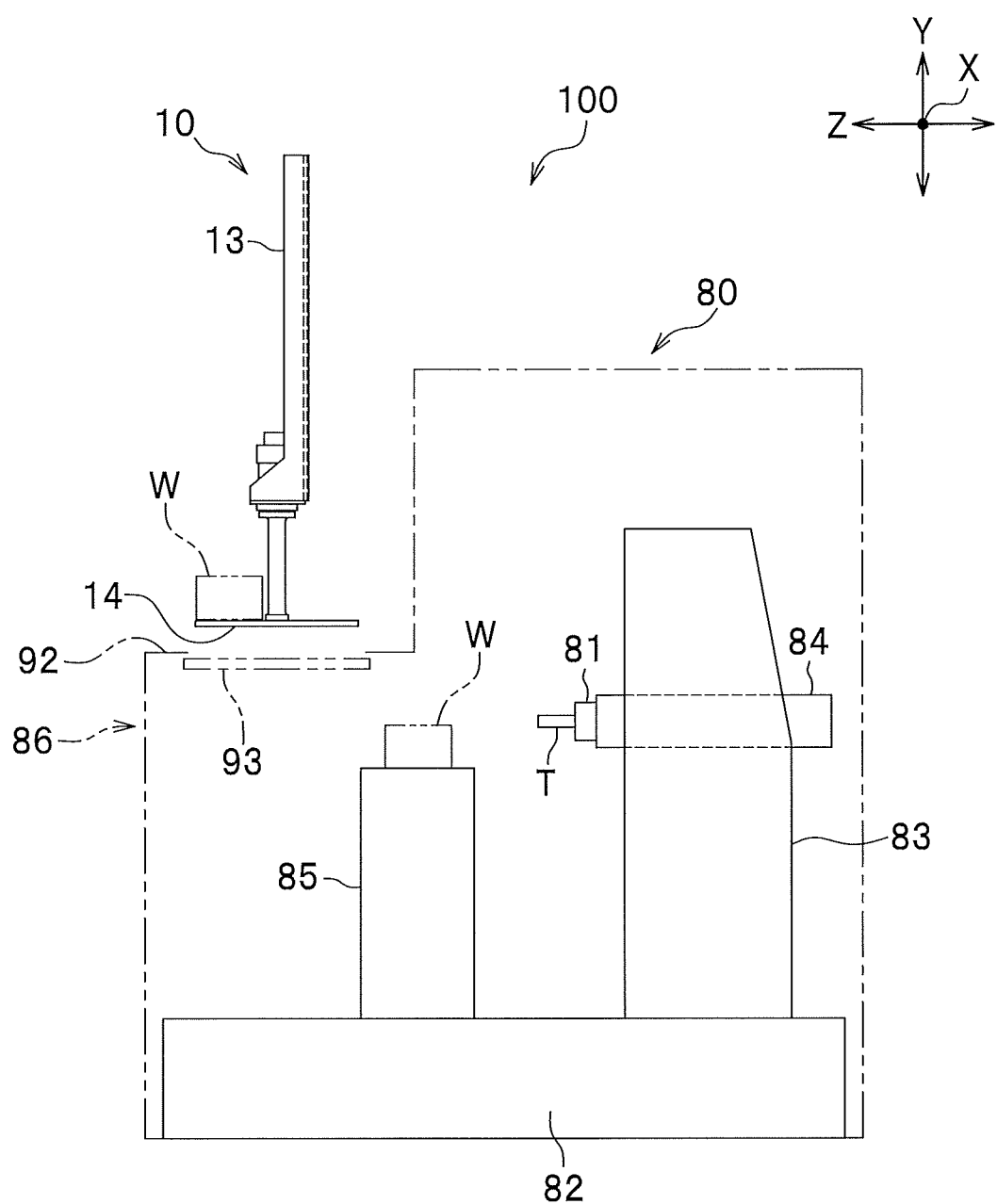
FIG. 2 is a schematic side view of the processing line.

FIG. 1 is a schematic front view of a processing line 100 in an embodiment of the present invention. FIG. 2 is a schematic side view of the processing line 100. FIG. 3 is a schematic perspective view showing the periphery of a work support device 85 of a machine tool 80 shown in FIG. 1.

In FIG. 1 and FIG. 2, X-axis direction corresponds to the left-right direction (horizontal direction), Y-axis direction corresponds to the upper-lower direction (vertical direction), and Z-axis direction corresponds to the front-rear direction (depth direction) (likewise in FIGS. 3 to 6). In FIG. 2, a gantry type conveying device 10 is shown only partially, for the brevity of illustration.

As shown in FIG. 1 and FIG. 2, the processing line 100 is provided with the gantry type conveying device 10 for conveying a work W as a conveyance object, and machine tools 80 for processing the work W. On the processing line 100, a plurality of machine tools 80 are arranged along X-axis direction, however, in FIG. 1, only one unit is shown for the convenience of description. In this case, the gantry type conveying device 10 conveys the work W into the machine tool 80 installed at the upstream end of the flow of the work W, conveys the work W to a neighboring one of the machine tools 80, and conveys the work W out from the machine tool 80 installed at the downstream end. However, only one machine tool 80 may be arranged on the processing line 100. In this case, the gantry type conveying device 10 conveys the work W from a work storage section for conveying-in into a machine tool 80, and conveys the work W out from the machine tool 80 to a work storage section for conveying-out.

As shown in FIG. 2, in the present embodiment, a machine tool 80 is a horizontal type machine tool on which a main shaft 81 is arranged such as to be along the horizontal direction. The machine tool 80 is provided with a base 82, a column 83, a saddle 84, a work support device 85, and a cover 86.

The column 83 is arranged on the base 82, movably in X-axis direction (the direction perpendicular to the sheet of FIG. 2), the movement being relative to the base 82. The column 83 is moved along X-axis direction by screw transfer by forward and reverse rotation of a screw shaft (not shown) driven by a motor (not shown) installed to the base 82. The saddle 84 is arranged movably in Y-axis direction (upper-lower direction), the movement being relative to the column 83. The saddle 84 is moved along Y-axis direction by screw transfer by forward and reverse rotation of a screw shaft (not shown) driven by a motor (not shown) installed to the column 83.

The saddle 84 rotatably supports the main shaft 81, a tool T being installed to the tip end of the main shaft 81. Inside the saddle 84, a rotation shaft (not shown) is disposed; one end side of the rotation shaft is connected to the main shaft 81; and the other end side of the rotation shaft is connected to a motor (not shown). When this motor is driven, the main shaft 81 is rotated.

The work support device 85 supports a work W, which is an object of processing. The work support device 85 is disposed movably, the movement being relative to the base 82 and in the horizontal direction perpendicular in a plan view to the extension direction of a beam 11 (see FIG. 1), in other words Z-axis direction (front-rear direction). The work support device 85 is moved along Z-axis direction by screw transfer by forward and reverse rotation of a screw shaft (not shown) driven by a motor (not shown) installed to the base 82.

As shown in FIG. 3, the work support device 85 is provided with a carriage 87 movable in Z-axis direction, and a holding section 88 installed to the carriage 87 to hold a work W. The holding section 88 is installed to the carriage 87, rotatably around A-axis, which is parallel to the beam 11 (see FIG. 1). The holding section 88 is provided with a turn table 90 rotated through a driving force transmission mechanism (not shown) such as gears or belt, by driving a motor 89, and a jig 91 that is installed to the turn table 90 to position and set the work W.

As shown in FIG. 1 and FIG. 2, the cover 86 is arranged such as to cover the processing region in processing a work W, the work support device 85, and the like, so as to prevent scattering and leaking of coolant and the like.

A front upper surface 92 of the cover 86 is formed such as to be located lower than the rear upper surface. In such a manner, a mount 14 of the gantry type conveying device 10 can be made close to the work support device 85 to a larger extent in the height direction (Y-axis direction). Accordingly, it is possible to make it easy to convey the work W into or out from the work support device 85.

Further, the front upper surface 92 of the cover 86 is provided with a door 93 openable and closable, for example, such as to slide in left-right direction (X-axis direction). The door 93 is opened when a work W is conveyed into or out from the machine tool 80, and is closed when the work W is processed.

The gantry type conveying device 10 is provided with the beam 11 horizontally arranged, a runner 12 that is driven along the beam 11, an elevator 13 that is supported movably in upper-lower direction relatively to the runner 12, and the mount 14 supported at the lower portion of the elevator 13 to mount the work W. The beam 11 is fixed at the upper portions of the plural posts 15, 15.

Figure 4:
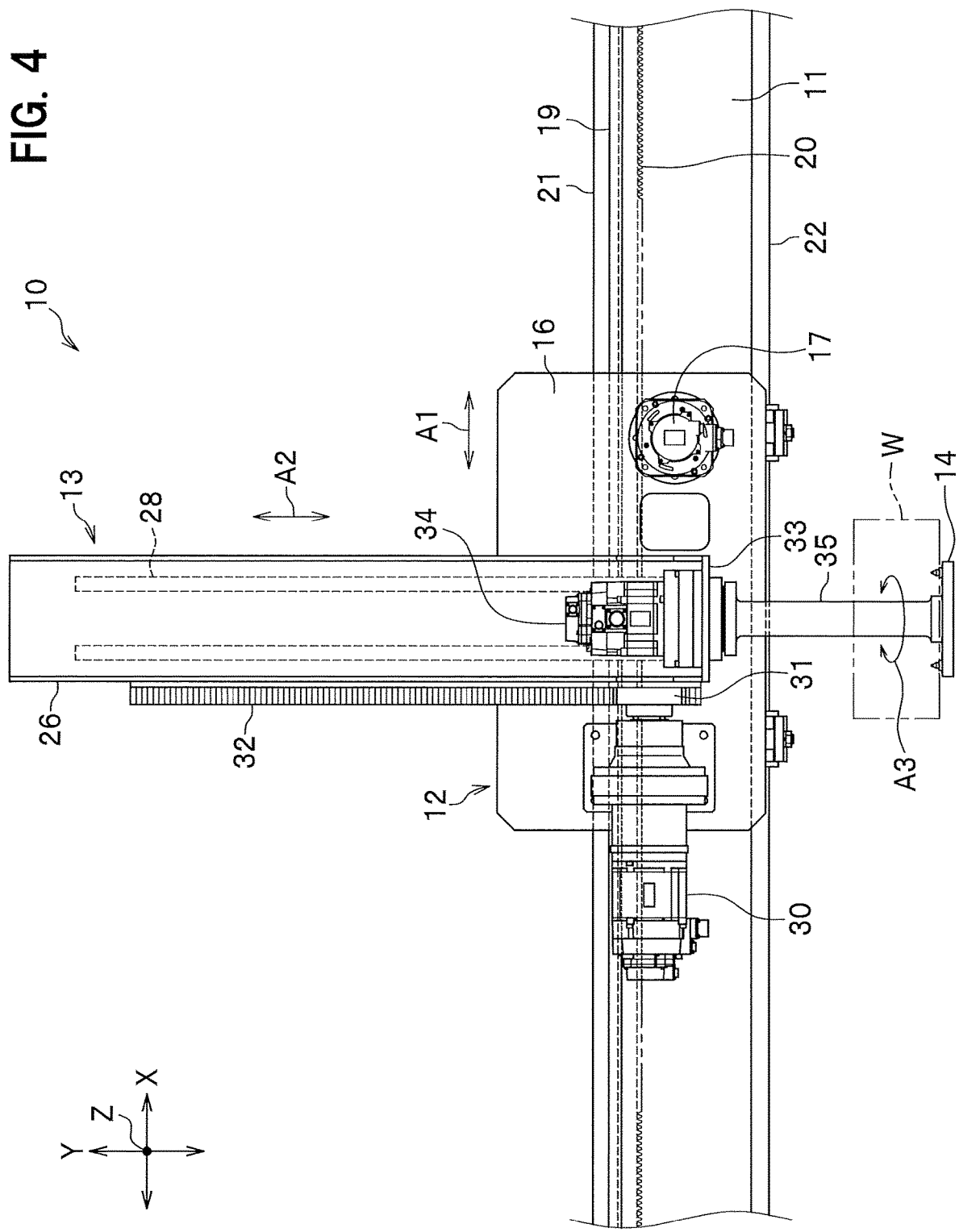
FIG. 4 is an enlarged front view of the periphery of a runner of a gantry type conveying device shown in FIG. 1.
Figure 5:
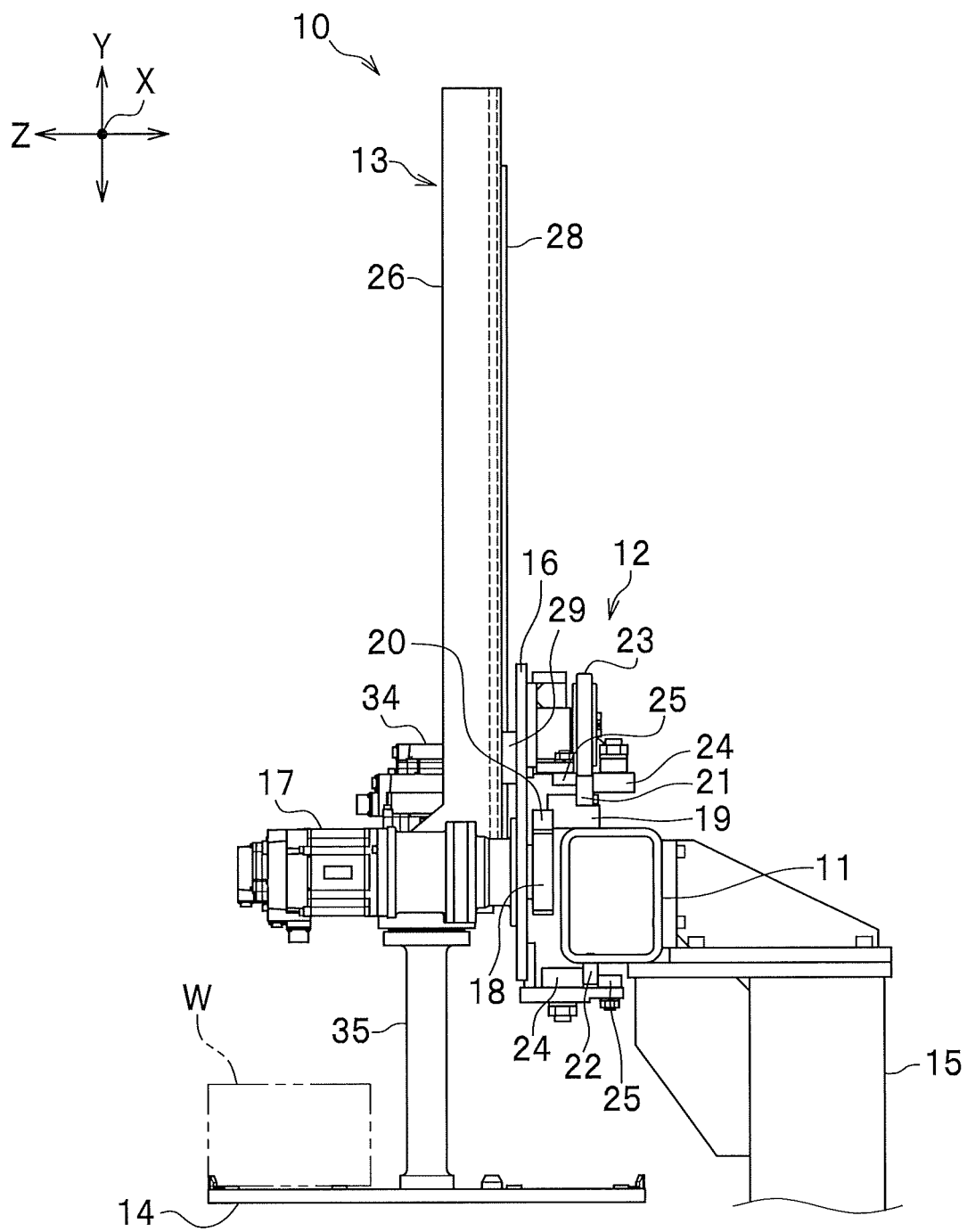
FIG. 5 is an enlarged side view of the periphery of the runner of the gantry type conveying device.
Figure 6:
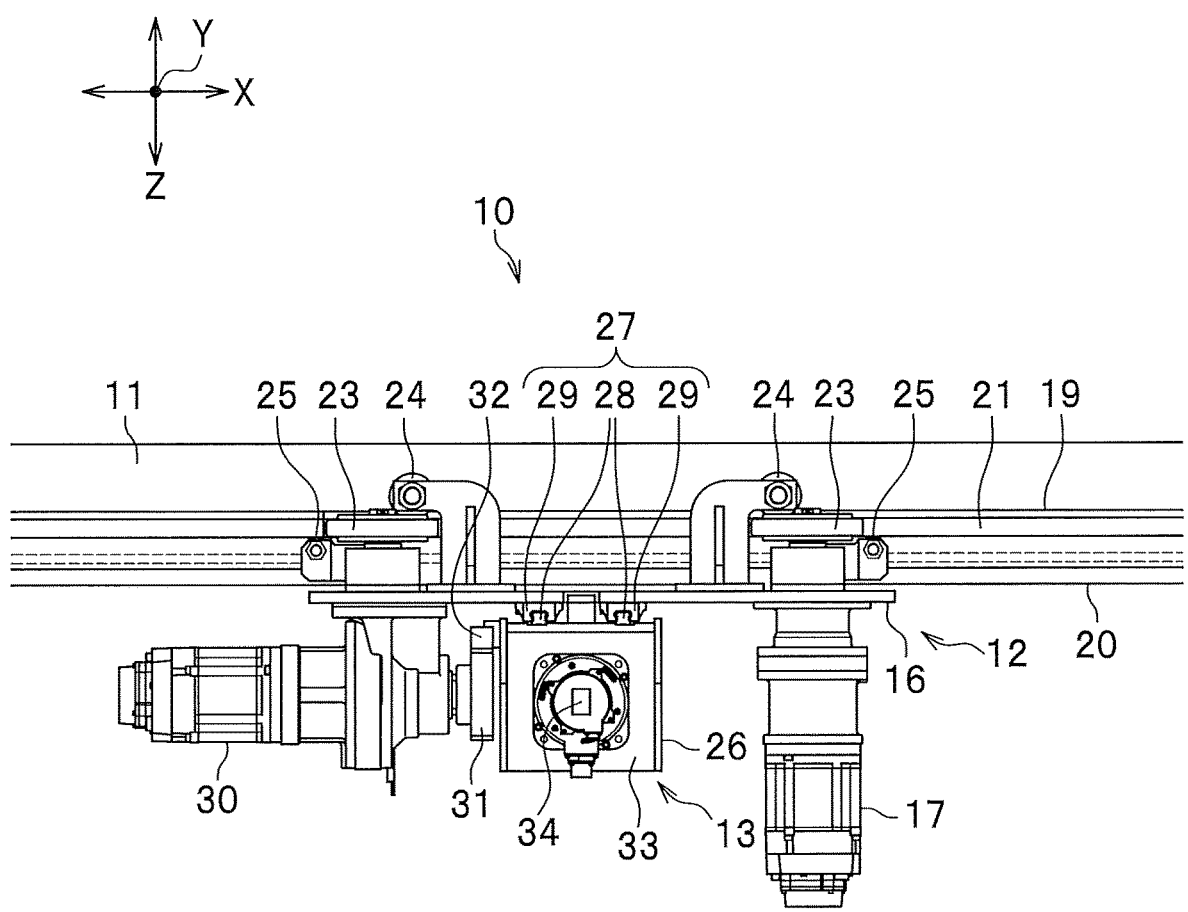
FIG. 6 is an enlarged plan view of the periphery of the runner of the gantry type conveying device.
Figure 7A:
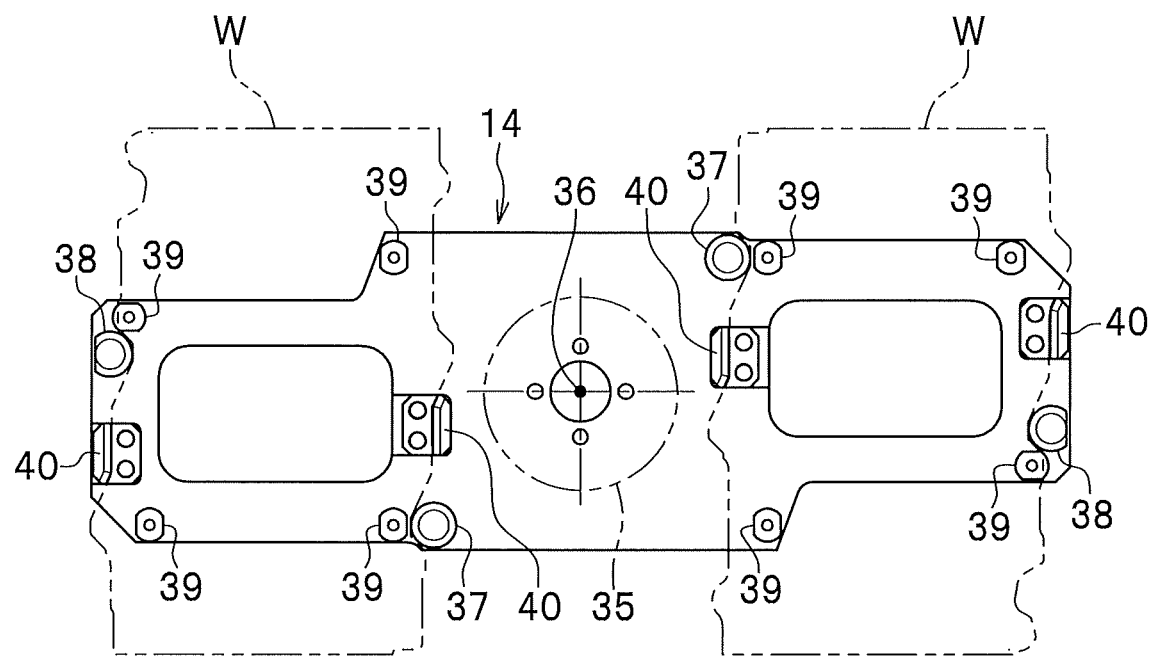
FIG. 7A is an enlarged plan view of a mount and FIG. 7B is an enlarged side view of the mount.
Figure 7B:
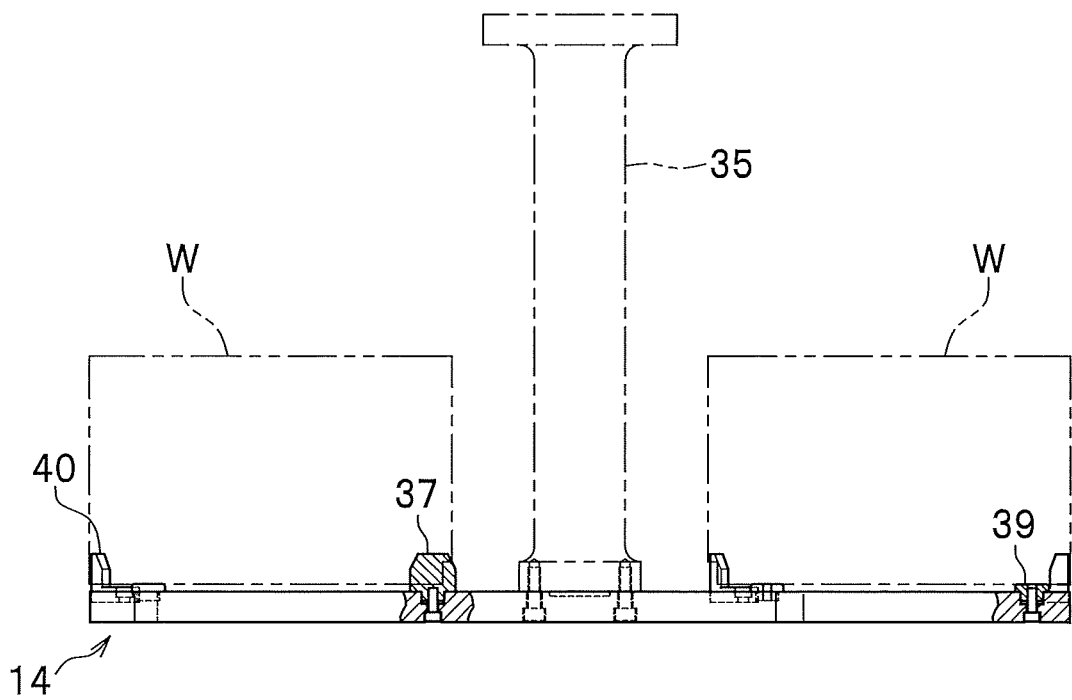

FIG. 4 is an enlarged front view of the periphery of the runner 12 of the gantry type conveying device 10 shown in FIG. 1. FIG. 5 is an enlarged side view of the periphery of the runner 12 of the gantry type conveying device 10. FIG. 6 is an enlarged plan view of the periphery of the runner 12 of the gantry type conveying device 10. FIG. 7A is an enlarged plan view of the mount 14 and FIG. 7B is an enlarged side view of the mount 14. Incidentally, in FIG. 6, the mount 14 and the like are not shown, for the brevity of description.

As shown in FIG. 4, the runner 12 is provided with a running plate 16 in a rectangular shape in a front view. A running servo motor 17 is mounted on the running plate 16.

As shown in FIG. 5, a pinion 18 is connected to the drive shaft of the running servo motor 17. The pinion 18 is engaged with a rack 20 installed to the beam 11 through a reference block 19. Accordingly, the runner 12 can run (see arrow A1 in FIG. 4) along the beam 11, driven by the running servo motor 17.

An upper rail 21 is installed to the upper surface of the reference block 19, and a lower rail 22 is installed to the lower surface of the beam 11. On the other hand, a load receiving roller 23 is installed to the running plate 16 to be rotatable. The load receiving roller 23 rolls in sliding contact with the upper surface of the upper rail 21, and receives and supports the load of the runner 12 and the like. Further, the upper rail 21 and the lower rail 22 are sandwiched respectively by guide rollers 24, 25 from the respective both ends so that the runner 12 is guided in running.

As shown in FIG. 6, the elevator 13 is provided with a longitudinal elevation member 26 with a horizontal cross-section substantially in a C-shape (U-shape). The elevator 13 is supported on the running plate 16 by a movement guide mechanism 27, such as to be movable in vertical direction (Y-axis direction). The movement guide mechanism 27 is provided with two guide rails 28 installed to the back surface (rear surface) of the elevation member 26, and plural sliders 29 slidably engaged with the respective guide rails 28, and is a known linear movement mechanism.

As shown in FIG. 4, an elevation servo motor 30 is mounted on the running plate 16. A pinion 31 is connected to the drive shaft of the elevation servo motor 30. The pinion 31 is engaged with a rack 32 installed to the side surface of the elevation member 26 of the elevator 13. Accordingly, being driven by the elevation servo motor 30, the elevator 13 is movable in upper-lower direction (see arrow A2 in FIG. 4), relatively to the runner 12.

Accompanying the upward-downward movement of the elevator 13, the mount 14 is moved up and down between the upper position (see FIG. 8A, etc.) taken when the work W is conveyed along the beam 11 and a lower position (see FIG. 8B, etc.) taken when the work W is supplied to or removed from the machine tool 80.

The elevation member 26 of the elevator 13 is provided with a bottom wall 33 on the lower end side. A rotary servo motor 34 is mounted on the upper surface of the bottom wall 33 of the elevation member 26. A rotation shaft 35 is connected to the drive shaft of the rotary servo motor 34. The mount 14 is fixed at the lower end of the rotation shaft 35. That is, the mount 14 is supported by the bottom wall 33 at the lower portion of the elevator 13 through the rotary servo motor 34 and the rotation shaft 35, such as to be able to rotate around a vertical axis (Y-axis) (see arrow A3 in FIG. 4).

As shown in FIGS. 7A and 7B, the mount 14 has a plate shape that is substantially rectangular. Herein, the concept 'rectangular shape' includes not only 'strictly rectangular' but also 'substantially rectangular shape', for example, a rectangular shape whose corner portions are chamfered, rounded, or partially notched. Plural works W (herein, two) can be mounted on the mount 14. Concretely, the mount 14 is in a point symmetric shape with respect to a fitting center 36 of the rotation shaft 35, and the works W can be mounted on the both sides, with the fitting center 36 therebetween.

The mount 14 is provided with positioning pins 37, 38, which serve as positioning members for positioning the works W in a horizontal surface on the mount 14, the positioning pins 37, 38 being fixed by screw fastening or the like. Further, the mount 14 is provided with support pads 39 and guides 40 fixed by screw fastening or the like. The works W are positioned on a horizontal surface such that the positioning pins 37, 38 come in contact with the side surfaces of the works W while the works W are guided by the guides 40. The works W are supported such that the support pads 39 receive loads.

Incidentally, the structure of positioning and mounting the works W on the mount 14 is not limited to the above-described structure. For example, the works W may be positioned on the horizontal surface such that positioning pins, which are fixed on the mount 14, are inserted in hole portions formed on the works W. In this case, large diameter portions in a stepped shape may be arranged at the lower portions of the positioning pins so that these large diameter portions receive the loads of the works W to support the works W.

In the present embodiment, the work support device 85 (see FIG. 2) of the machine tool 80 has also a function to deliver a work W between the work support device 85 and the mount 14 and move the work W in Z-axis direction (front-rear direction).

In the following, operations in the above-described present embodiment will be described. First, referring to FIGS. 8 to 10, a method of conveying a work W with the lower surface of a work W as a fitting reference surface, which faces the jig 91 will be described.

The jig 91 in FIGS. 8 to 10 is used to fit a work W to the holding section 88 of the work support device 85, with the lower surface of the work W as the fitting reference surface. In FIGS. 8 to 10, the work W without hatching shows a work W before processing on the machine tool 80 concerned, while the hatched work W shows a work W after processing (likewise in FIGS. 12 to 14).

Figure 8A:
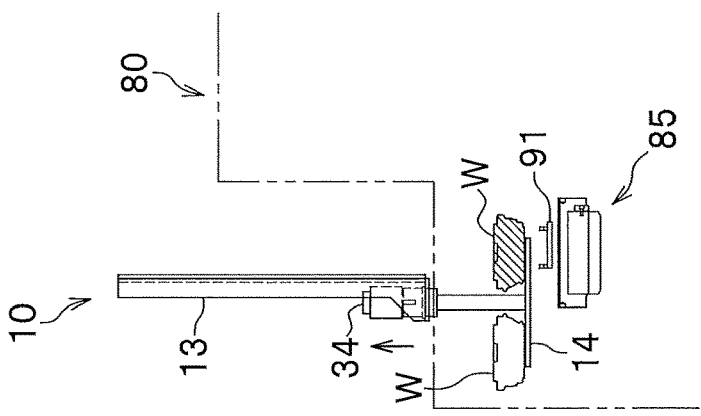
FIGS. 8A to 8D are schematic side views for illustrating a method of conveying a work, with the lower surface of the work as a fitting reference surface facing a jig.

As shown in FIG. 8A, when the gantry type conveying device 10 starts operation upon an instruction from a control device (not shown, likewise hereinafter), the runner 12 (see FIG. 4, likewise hereinafter) is driven by the running servo motor 17 (see FIG. 4, likewise hereinafter) to run along the beam 11 (see FIG. 4, likewise herein). Then, the runner 12 moves to and stops at a position right above the door 93 arranged on the front upper surface 92 of the cover 86 of the machine tool 80 (see FIG. 2 for each, likewise hereinafter).

Herein, the mount 14 is located at the upper position when the work W is conveyed along the beam 11. The work support device 85 is located at a rear position that is set posterior to the mount 14 of the gantry type conveying device 10 in Z-axis direction (front-rear direction). The work W after processing is clamped by a clamp mechanism (not shown, likewise hereinafter) provided on the holding section 88 of the work support device 85 (see FIG. 3, likewise hereinafter).

Figure 8B:
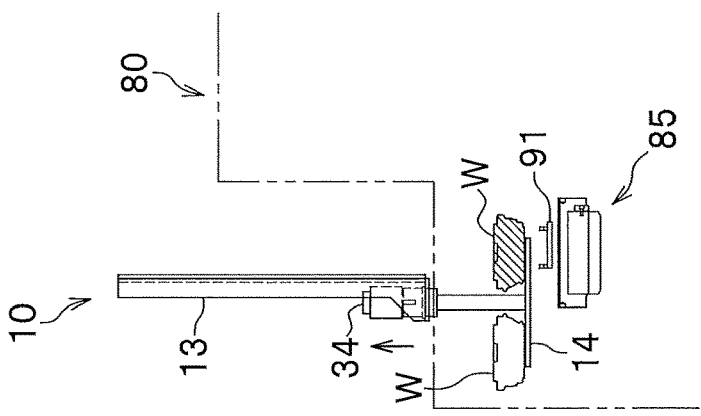

Subsequently, the door 93 is opened, and as shown in FIG. 8B, the elevator 13 is driven by the elevation servo motor 30 (see FIG. 4, likewise hereinafter) to move down. Accompanying this, the mount 14 moves down to and stops at the lower position taken when the mount 14 supplies the work W to or removes the work W from the machine tool 80.

Figure 8C:
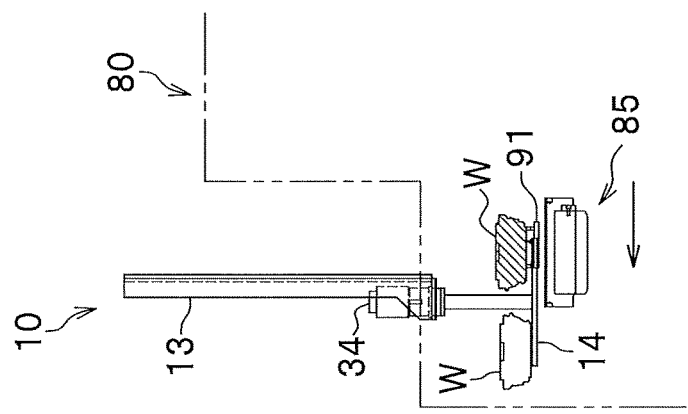

Subsequently, as shown in FIG. 8C, the work support device 85 moves forward to and stops at a front position taken when the work support device 85 delivers the work W. Then, a portion of the mount 14, at which portion a work W is not mounted on the mount 14 and the portion is free, is inserted below the work W which is after processing and fitted to the jig 91 of the work support device 85.

Figure 8D:
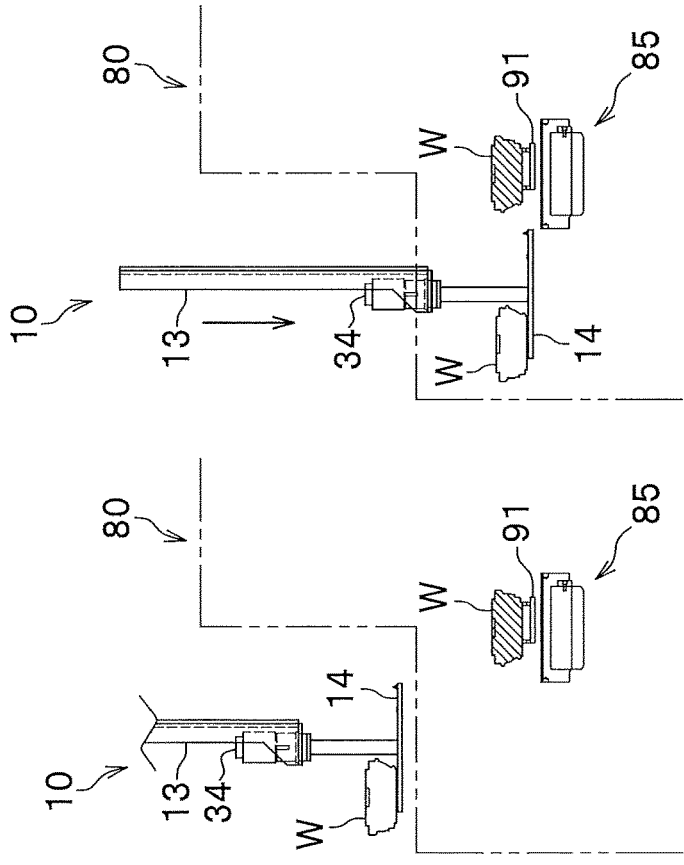

Subsequently, the clamp of the work W by the clamp mechanism is released, and as shown in FIG. 8D, the elevator 13 is driven by the elevation servo motor 30 to move up by a predetermined distance. Accompanying this, the mount 14 moves up to and stops at a middle position that is between the above-described upper position and the lower position and is a little higher than the lower position. Thus, the work W is lifted by the predetermined distance to be mounted on the mount 14.

Subsequently, as shown in FIG. 9A, the work support device 85 moves backward to and stops at an off-position that is between the above-described front position and the rear position and is a little posterior to the front position.

Subsequently, as shown in FIG. 9B, the mount 14 is driven by the rotary servo motor 34 to rotate by 180 degrees around the vertical axis (Y-axis). Thus, the positions of the work W before processing and the work W after processing are switched to each other in the front-rear direction.

Subsequently, as shown in FIG. 9C, the work support device 85 moves forward from the off-position to the front position and stops.

Subsequently, as shown in FIG. 9D, the elevator 13 is driven by the elevation servo motor 30 to move down by the predetermined distance. Accompanying this, the mount 14 moves down from the middle position to the lower position and stops. Thus, the work W before processing is mounted onto the jig 91 and clamped by the clamp mechanism.

Figure 10A:
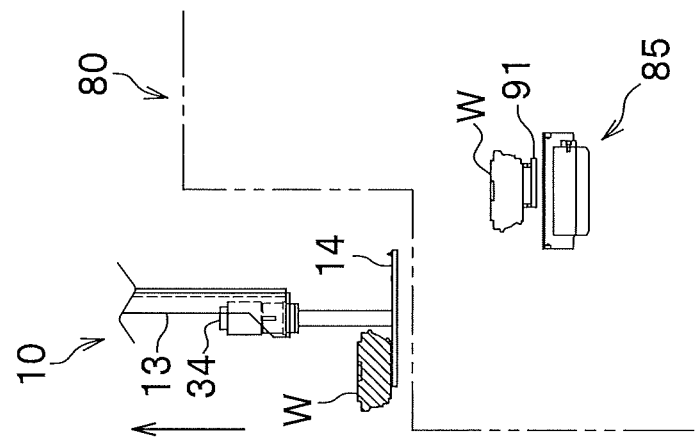
FIGS. 10A and 10B are schematic side views for illustrating the method of conveying a work following FIGS. 9A to 9D.

Subsequently, as shown in FIG. 10A, the work support device 85 moves backward to the above-described rear position and stops. Then, the portion, at which the work W before processing has been mounted on the mount 14, is relatively drawn out from below the work W before processing and comes to appear.

Figure 10B:
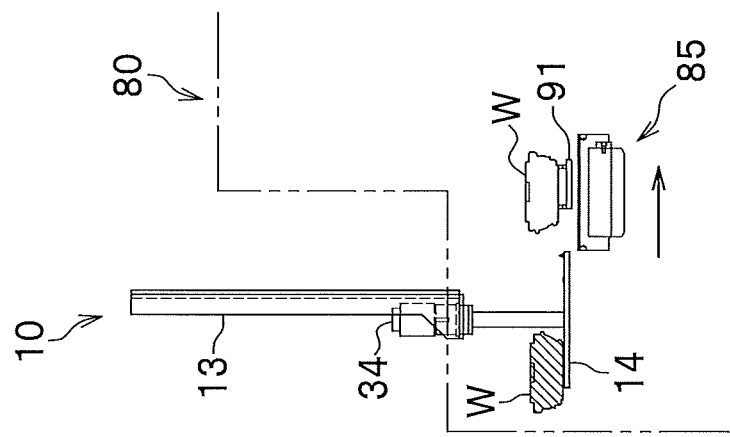

Subsequently, as shown in FIG. 10B, the elevator 13 is driven by the elevation servo motor 30 to move up. Accompanying this, the mount 14 moves up to the above-described upper position and stops, and the door 93 gets closed. Thereafter, the machine tool 80 performs certain processing of the work W, which is supported by the work support device 85 and is before processing.

Subsequently, referring to FIGS. 11 to 14D, a method of conveying a work W, with the upper surface of the work W as a fitting reference surface facing the jig 91, will be described.

Figure 11:
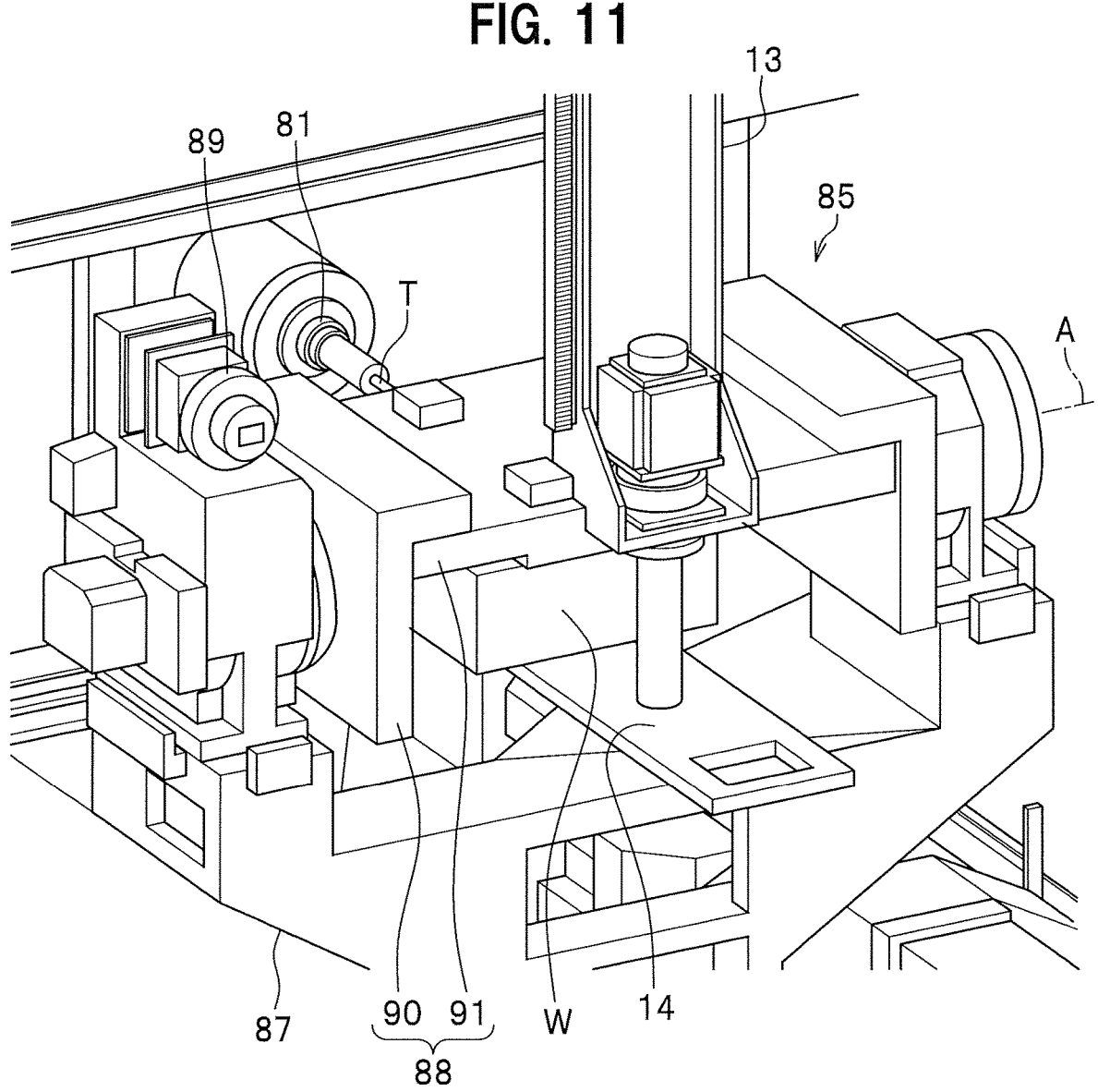
FIG. 11 is a schematic perspective view showing the periphery of the work support device in a state that a jig of a hold section is at an upper position as a result of being rotated by 180 degrees around A-axis from a lower position shown in FIG. 3.

FIG. 11 is a schematic perspective view showing the periphery of the work support device 85 in a state that the jig 91 of the hold section 88 is at an upper position as a result of being rotated by 180 degrees around A-axis from a lower position shown in FIG. 3. FIGS. 12A to 14 D are schematic side views for illustrating a method of conveying a work W, with the upper surface of the work W as a fitting reference surface facing the jig 91.

The jig 91 in FIGS. 12A to 14D is a jig for fitting the work W to the holding section 88 of the work support device 85, with the upper surface of the work W as the fitting reference surface.

As shown in FIG. 12A, when the gantry type conveying device 10 starts operation upon an instruction from the control device, the runner 12 is driven by the running servo motor 17 to run along the beam 11. Then, the runner 12 moves to and at the position right above the door 93 arranged on the front upper surface 92 of the cover 86 of the machine tool 80.

In this occasion, the mount 14 is at the upper position taken when the work W is conveyed along the beam 11. The work support device 85 is at the rear position that is set posterior to the mount 14 in Z-axis direction (front-rear direction). The work W is clamped by the clamp mechanism arranged on the holding section 88 at an upper position, as shown in FIG. 11.

Subsequently, the door 93 gets opened, and as shown in FIG. 12B, the elevator 13 is driven by the elevation servo motor 30 to move down. Accompanying this, the mount 14 moves down to and stops at the lower position taken when the work W is supplied to or removed from the machine tool 80.

Subsequently, as shown in FIG. 12C, the work support device 85 moves forward to and stops at the front position taken when the work support device 85 delivers the work W. Then, a portion of the mount 14, at which portion a work W is not mounted on the mount 14 and the portion is free, is relatively inserted below the work W which is after processing and installed to the jig 91 of the work support device 85.

Subsequently, as shown in FIG. 12D, the elevator 13 is driven by the elevation servo motor 30 to move up by a predetermined distance. Accompanying this, the mount 14 moves up to and stops at the middle position that is between the above-described upper position and the lower position and is a little higher than the lower position. The clamp of the work W by the clamp mechanism is released at this middle position, and the work W after processing gets mounted onto the mount 14.

Subsequently, as shown in FIG. 13A, the elevator 13 is driven by the elevation servo motor 30 to move down by the predetermined distance. Accompanying this, the mount 14 moves down to the above-described lower position and stops.

Subsequently, as shown in FIG. 13B, the work support device 85 moves backward to and stops at the off-position that is between the above-described front position and the rear position and is a little posterior to the front position.

Subsequently, as shown in FIG. 13C, the mount 14 is driven by the rotary servo motor 34 to rotate by 180 degrees around the vertical axis (Y-axis). Thus, the positions of the work W before processing and the work W after processing are switched to each other in the front-rear direction.

Subsequently, as shown in FIG. 13D, the work support device 85 moves forward from the off-position to the front position and stops.

Subsequently, as shown in FIG. 14A, the elevator 13 is driven by the elevation servo motor 30 to move up by the predetermined distance. Accompanying this, the mount 14 moves up to the above-described middle position and stops. The work W before processing is clamped at this middle position by the clamp mechanism.

Subsequently, as shown in FIG. 14B, the elevator 13 is driven by the elevation servo motor 30 to move down by the predetermined distance. Accompanying this, the mount 14 moves down to the above-described lower position and stops.

Subsequently, as shown in FIG. 14C, the work support device 85 moves backward to the above-described rear position and stops. Then, the portion, at which the work W before processing has been mounted on the mount 14, is relatively drawn out from below the work W and comes to appear.

Subsequently, as shown in FIG. 14D, the elevator 13 is driven by the elevation servo motor 30 to move up. Accompanying this, the mount 14 moves up to the above-described upper position and stops, and the door 93 is closed. Thereafter, the machine tool 80 performs certain processing of the work W, which is supported by the work support device 85 and is before processing.

As described above, the gantry type conveying device 10 in the present embodiment is provided with the runner 12, which runs along the beam 11, the elevator 13, which is supported movably in upper-lower direction relatively to the runner 12, and the mount 14, which is supported at the lower portion of the elevator 13 to mount a work W on.

Accordingly, in the present embodiment, a work W is conveyed in such a manner that the work W is mounted on the mount 14 that is supported at the lower portion of the elevator 13, which is movable in upper-lower direction relatively to the runner 12 which runs along the beam 11. That is, the work W is lifted by the mount 14 and moved (lift and carry). In such a manner, on the gantry type conveying device 10, it is possible to hold and convey a work W by just mounting the work W on the mount 14, without the necessity of clamping the work W as conventional. Accordingly, a unit such as clamp-driving means is unnecessary.

Consequently, according to the present embodiment, it is possible to provide a gantry type conveying device 10 that enables reduction in the number of components and has a compact and simple structure.

Further, as clamping operation of a work W is not performed on the gantry type conveying device 10, the conveyance time can be shortened. Further, as the mount 14 has a simple structure without driving means and electrical wires, even when the kind of a work W is changed, it is possible to easily replace the mount 14, corresponding to the kind of the work W.

Further, in the present embodiment, plural works W can be mounted on the mount 14, and the mount 14 is supported at the bottom wall 33, which is the lower portion of the elevator 13, such as to be able to rotate around the vertical axis via the rotary servo motor 34 and the rotation shaft 35.

By this structure, efficient conveying is enabled because plural works W can be mounted on a single mount 14 and simultaneously conveyed. For example, for a gantry type conveying device, on which conventional clamping of works W is performed, it is necessary to provide two robot hands as one set for replacing works in order to replace, for a machine tool 80, between a work W before processing and a work W after processing. On the other hand, according to the present embodiment, for example, by mounting a work W before processing and a work W after processing on a single mount 14 and turning the mount 14 around a vertical axis, it is possible to selectively move one work W to a position facing a machine tool 80. In such a manner, it is possible to replace a work W before processing and a work W after processing, using a single mount 14.

Further, in the present embodiment, the mount 14 is provided with the positioning pins 37, 38 for positioning works W on the mount 14.

By this structure, it is possible to prevent works W from deviating from the mount 14, and ensure the delivery of a work W between the mount 14 and, for example, the work support device 85 of a machine tool 80.

Still further, the processing line 100 in the present embodiment is provided with the gantry type conveying device 10 and the machine tool 80. The machine tool 80 is provided with the base 82 and the work support device 85, which is arranged such as to be movable, in a direction perpendicular to the extension direction of the beam 11 in a plan view, relatively to the base 82.

By this structure, it is possible to provide a processing line 100 for which a gantry type conveying device 10, which has a compact and simple structure and enables reduction in the number of components, is applied to a machine tool 80 or machine tools 80. Further, using the work support device 85 of the machine tool 80, as a mechanism for conveying a work W in a direction perpendicular to a beam, it is possible to convey this conveyance object to an arbitrary position in three-dimensional direction. In such a manner, it is possible to make the structure of the entire processing line 100 more compact and simple.

Yet further, in the present embodiment, the work support device 85 is provided with the carriage 87 movable in a direction perpendicular to the extension direction of the beam 11 in a plan view, and the holding section 88 installed to the carriage 87 to hold a work W, and the holding section 88 can rotate around A-axis in parallel to the beam 11.

By this structure, in making the holding section 88 hold a work W, it is possible to select one of the upper surface and the lower surface of the work W, as the fitting reference surface, the one facing the holding section 88. That is, it is possible to replace the fitting reference surface, of the work, which faces the holding section. In such a manner, for example, processing of both the upper surface and the lower surface of the work W is made possible.

The present invention has been described above, based on embodiments, however, the present invention is not limited to the structures described in the above-described respective embodiments, and it is possible to change or modify the structures described in the respective embodiments in a range without departing from the spirit, including appropriate combination and selection. Further, the structures in the above-described embodiments allow partial addition, deletion, and substitution.

For example, the above embodiments have been described, taking an example of applying the invention to a horizontal type machine tool, however, without being limited thereto, the invention can be applied to various machine tools. The present invention can be applied, for example, to vertical type machine tools, and machining centers provided with an automatic tool replacing device.

Further, although, the above embodiments have been described, taking an example where conveyance objects conveyed by the gantry type conveying device 10 are works W, however, the invention is not limited thereto. The gantry type conveying device 10 can also convey, for example, the jig 91 for setting a work W provided on the work support device 85. By such a structure, even if the kind of works W has been changed, the gantry type conveying device 10 can convey and replace the jig 91, corresponding to the kind of the works W.

Still further, although, in the above-described embodiments, as the driving force transmission mechanism in moving the runner 12 and the elevator 13 by a motor, a mechanism using a rack and pinion is used, the invention is not limited thereto. Other driving force transmission mechanisms, for example, a screw transfer mechanism, a mechanism using a belt and a pulley, or the like, may be used. Still further, in the above-described embodiments, as the mechanism for rotating the mount 14, a mechanism in which the rotation shaft 35 is connected to the drive shaft of the rotary servo motor 34 is used, however, the invention is not limited thereto. For example, a mechanism in which a gear fixed to the drive shaft of the rotary servo motor 34 is engaged with a gear fixed to the rotation shaft 35 may be used.

Further, although, in the above-described embodiments, the mount 14 allows mounting two works W thereon, the invention is not limited thereto, and a structure allowing mounting more than two works W thereon may be applied. In this case, the mount 14 may have a structure on which plural kinds of works W can be simultaneously mounted. Further, although the mount 14 has a rectangular plate shape, the invention is not limited thereto. The mount 14 may have other shapes, for example, an elliptical shape, a cross shape, or the like in a plan view.

Still further, in the above-described embodiments, as the mechanism for conveying a work W in the direction perpendicular to a beam, the work support device 85 of the machine tool 80 is used, however, the invention is not limited thereto. For example, the gantry type conveying device 10 may be provided with a shifting device that delivers a work W between itself and the mount 14 and moves the work W in a direction (front-rear direction) perpendicular in a plan view to the extension direction of the beam may be provided. By this structure, it is possible to move a work W that is lifted by the mount 14 and moved along the beam 11 can be moved by the shifting device in a direction perpendicular to the beam 11. In such a manner, the work W can be conveyed to a three dimensionally arbitrary position.

DESCRIPTION OF REFERENCE SYMBOLS 10 gantry type conveying device
11 beam
12 runner
13 elevator
14 mount
15, 15 post
16 running plate
17 running servo motor
18 pinion
19 reference block
20 rack
21 upper rail
22 lower rail
23 load receiving roller
24, 25 guide roller
26 elevation member
27 movement guide mechanism
28 guide rail
29 slider
30 elevation servo motor
31 pinion
32 rack
33 bottom wall
34 rotary servo motor
35 rotation shaft
36 fitting center
37, 38 positioning pin (positioning member)
39 support pad
40 guide
80 machine tool
81 main shaft
82 base
83 column
84 saddle
85 work support device
86 cover
87 carriage
88 holding section
89 motor
90 turn table
91 jig
92 front upper surface
93 door
100 processing line
T tool
W work (conveyance object)

The invention claimed is:
1. A gantry type conveying device, comprising:
a beam horizontally arranged;
a runner that runs along the beam;
an elevator that is supported movably in upper-lower direction relatively to the runner;
a mount that includes an upper horizontal surface and is supported at a lower portion of the elevator to mount a conveyance object on the upper horizontal surface without clamping the conveyance object toward the mount during conveying, the beam being disposed above the mount; and a shifting device comprising a rotary servo motor, a jig, and a work support device that shifts the conveyance object in a direction perpendicular to an extension direction of the beam in a plan view to deliver the conveyance object between the shifting device and the mount, wherein the work support device comprises a holder that holds the conveyance object to receive the conveyance object from the mount.

2. The gantry type conveying device according to claim 1, wherein the mount is supported at the lower portion of the elevator rotatably around a vertical axis, and wherein the mount has a plate shape and spaces for mounting a plurality of the conveyance objects on both sides opposite in a horizontal direction across the vertical axis.

3. The gantry type conveying device according to claim 2, wherein the mount is provided with a positioner that positions the conveyance objects on the mount.

4. The gantry type conveying device according to claim 3, wherein the work support device includes a carriage movable in the direction perpendicular to the extension direction of the beam in the plan view, and the holder that is installed to the carriage and holds the work, and wherein the holder is installed to the carriage rotatably around an axis that is parallel to the beam.

5. The gantry type conveying device according to claim 2, wherein the work support device includes a carriage movable in the direction perpendicular to the extension direction of the beam in the plan view, and the holder that is installed to the carriage and holds the work, and wherein the holder is installed to the carriage rotatably around an axis that is parallel to the beam.

6. The gantry type conveying device according to claim 1, wherein the mount is provided with a positioner that positions the conveyance object on the mount.

7. The gantry type conveying device according to claim 6, wherein the work support device includes a carriage movable in the direction perpendicular to the extension direction of the beam in the plan view, and the holder that is installed to the carriage and holds the work, and wherein the holder is installed to the carriage rotatably around an axis that is parallel to the beam.

8. A processing line, comprising:

the gantry type conveying device according to claim 1 and a machine tool that performs processing of a work, wherein the conveyance object includes the work, and wherein the machine tool is provided with a base, and a work support device that is arranged movably in a direction perpendicular to an extension direction of the beam in a plan view and supports the work.

9. The processing line according to claim 8, wherein the work support device of the machine tool includes a carriage movable in the direction perpendicular to the extension direction of the beam in the plan view, and a holder that is installed to the carriage and holds the work, and wherein the holder is installed to the carriage rotatably around an axis that is parallel to the beam.

10. The gantry type conveying device according to claim 1, wherein the upper horizontal surface is larger than a dimension of the conveyance object entirely in a horizontal direction so that the conveyance object is placed on any place inside the upper horizontal surface.

11. The gantry type conveying device according to claim 1, wherein the beam supports the runner continuously at any position along the beam.

12. The gantry type conveying device according to claim 1, wherein the mount comprises a mounting table which mounts the conveyance object on an inside of the upper horizontal surface of the mount table during conveying.

13. The gantry type conveying device according to claim 1, wherein the mount has an open space above the mount and the conveyance object.

14. The gantry type conveying device according to claim 1, further comprising a rotation shaft, wherein the mount is supported at the lower portion of the elevator rotatably around a vertical axis through the rotation shaft on the vertical axis, and wherein the mount is connected to a lower end of the rotation shaft where the conveyance objects are disposed on the upper surface on both sides across the vertical axis.

* * * * *